US012607390B2

(12) United States Patent
Lee

(10) Patent No.: US 12,607,390 B2
(45) Date of Patent: Apr. 21, 2026

(54) LAMINATE FOR BI-DIRECTIONAL COLOR RADIATIVE COOLING AND MATERIAL FOR RADIATIVE COOLING INCLUDING THE SAME

(71) Applicants: Hyundai Motor Company, Seoul (KR); Kia Corporation, Seoul (KR)

(72) Inventor: Min Jae Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 18/459,762

(22) Filed: Sep. 1, 2023

(65) Prior Publication Data

US 2024/0328683 A1 Oct. 3, 2024

(30) Foreign Application Priority Data

Mar. 31, 2023 (KR) ........................ 10-2023-0042932

(51) Int. Cl.
*F25B 23/00* (2006.01)
*B32B 5/02* (2006.01)
(Continued)

(52) U.S. Cl.
CPC ............ *F25B 23/003* (2013.01); *B32B 5/022* (2013.01); *B32B 7/023* (2019.01); *B32B 15/08* (2013.01); *B32B 15/085* (2013.01); *B32B 27/08* (2013.01); *B32B 27/12* (2013.01); *B32B 27/32* (2013.01); *B32B 27/365* (2013.01); *F28F 13/18* (2013.01); *B32B 2307/402* (2013.01); *B32B 2307/416* (2013.01); *B32B 2307/7376* (2023.05); *B32B 2605/00* (2013.01)

(58) Field of Classification Search
CPC .......... B32B 5/02; B32B 5/022; B32B 7/023; B32B 15/08; B32B 15/085; B32B 27/08; B32B 27/12; B32B 27/32; B32B 27/322; B32B 27/365; B32B 2307/402; B32B 2307/416; B32B 2307/422; B32B 2307/7376; B32B 2605/00; F25B 23/003; F28F 13/18
See application file for complete search history.

(56) References Cited

FOREIGN PATENT DOCUMENTS

| KR | 102154072 B1 | 9/2020 | |
| WO | WO-2022112881 A1 * | 6/2022 | ............. G02B 5/021 |
| WO | WO-2023090717 A1 * | 5/2023 | ............. F28F 13/18 |

OTHER PUBLICATIONS

Chen, Y., et al., "Colored and paintable bilayer coatings with high solar-infrared reflectance for efficient cooling," Science Advances, Research Article, vol. 6, Issue 17, Apr. 24, 2020, 9 pages.

* cited by examiner

*Primary Examiner* — Gerard Higgins
(74) *Attorney, Agent, or Firm* — Slater Matsil, LLP

(57) ABSTRACT

An embodiment laminate for color radiative cooling includes a transparent colored layer including a first thermoplastic resin, an ultraviolet ray and visible ray reflective layer on the transparent colored layer and including a polyolefin-based polymer, a first far-infrared ray emissive layer on the ultraviolet ray and visible ray reflective layer and including a second thermoplastic resin, a near-infrared ray reflective layer on the first far-infrared ray emissive layer and including a metal, and a second far-infrared ray emissive layer on the near-infrared ray reflective layer and including a third thermoplastic resin.

20 Claims, 4 Drawing Sheets

A

(51) Int. Cl.

| | | |
|---|---|---|
| *B32B 7/023* | (2019.01) | |
| *B32B 15/08* | (2006.01) | |
| *B32B 15/085* | (2006.01) | |
| *B32B 27/08* | (2006.01) | |
| *B32B 27/12* | (2006.01) | |
| *B32B 27/32* | (2006.01) | |
| *B32B 27/36* | (2006.01) | |
| *F28F 13/18* | (2006.01) | |

A

100
200
300
400
500

LAMINATE FOR BI-DIRECTIONAL COLOR RADIATIVE COOLING AND MATERIAL FOR RADIATIVE COOLING INCLUDING THE SAME

CROSS-REFERENCE TO RELATED APPLICATIONS

This application claims the benefit of Korean Patent Application No. 10-2023-0042932, filed on Mar. 31, 2023, which application is hereby incorporated herein by reference.

TECHNICAL FIELD

The present disclosure relates to a laminate for color radiative cooling and a material for radiative cooling including the same.

BACKGROUND

In general, energy consumption is essential for cooling. For example, general-purpose cooling devices such as a refrigerator and an air conditioner compress a refrigerant using energy and then perform the cooling by absorbing heat generated when the compressed refrigerant expands. Radiative cooling is a technology capable of performing the cooling without consuming the energy, unlike the general-purpose cooling device. To improve a radiative cooling efficiency, it is important to well control absorbency, reflectivity, and emissivity of light in each wavelength band. Most of the heat may be generated from incident sunlight and the sunlight may be divided into an ultraviolet (UV) ray, a visible ray, and an infrared ray. When the light of each wavelength band is reflected, inflow of the heat via the sunlight may be blocked. For example, an interior temperature of a black vehicle that absorbs light well rises easily on a sunny day, but a rise of an interior temperature of a white vehicle that reflects light relatively well without absorbing light is relatively slow.

As a material for such radiative cooling, various materials such as a polymer, a multi-layer thin film of inorganic materials or ceramic materials, a radiative cooling material including a metal reflective layer, a paint containing a white pigment, and the like are used. The polymer material generally has a high infrared absorptivity (emissivity) but has a short lifespan because the polymer material is easily deteriorated by the ultraviolet ray, moisture, and the like when left outdoors because of a nature of the material. In a case of the multi-layer thin film, the number of layers must be increased to increase the infrared emissivity, which increases an absorptivity for the sunlight, so that there is a limit in achieving a high-efficiency radiative cooling performance. In addition, the material including the metal reflective layer is difficult to be applied in real life because of problems of low long-term stability caused by oxidation of the metal and a unit cost and causes eye fatigue and light scattering because of regular reflection of such a metal material. The paint containing the white pigment is not usually composed of a material having a high extinction coefficient, so that there is a problem of insufficient radiative cooling performance resulted from insufficient infrared emissivity and ultraviolet reflectance.

As an alternative to such problem, Korean Patent No. 2154072 (Patent Document 1) discloses a coolant capable of rendering a color in the radiative cooling, containing a first material that emits the infrared ray to cause the radiative cooling, and a second material that absorbs light in an area of the visible ray, converts a wavelength of the light, and emits the light. However, as in Patent Document 1, the coolant in which the second material such as a dye or a semiconductor material is mixed with the first material that emits the infrared ray by electromagnetic resonance has a problem of the insufficient radiative cooling performance resulted from the low ultraviolet reflectance.

Therefore, there is a need for research and development on a material having excellent visible and infrared reflectivity and excellent infrared emissivity, and thus having excellent radiative cooling performance.

SUMMARY

The present disclosure relates to a laminate for color radiative cooling and a material for radiative cooling including the same. Particular embodiments relate to a laminate for color radiative cooling and a material for radiative cooling including the same having excellent visible and infrared reflectivity and excellent infrared emissivity and thus having an excellent cooling effect.

Embodiments of the present disclosure can solve problems occurring in the prior art while advantages achieved by the prior art are maintained intact.

An embodiment of the present disclosure provides a laminate and a material for radiative cooling including the same having excellent visible and infrared reflectivity and excellent infrared emissivity and thus having an excellent radiative cooling performance.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a laminate for color radiative cooling includes a transparent colored layer containing a first thermoplastic resin, an ultraviolet ray and visible ray reflective layer formed on the transparent colored layer, containing a polyolefin-based polymer, and reflecting an ultraviolet ray, a first far-infrared ray emissive layer formed on the ultraviolet ray and visible ray reflective layer and containing a second thermoplastic resin, a near-infrared ray reflective layer formed on the first far-infrared ray emissive layer and containing a metal, and a second far-infrared ray emissive layer formed on the near-infrared ray reflective layer and containing a third thermoplastic resin.

According to another embodiment of the present disclosure, a radiative cooling material includes the laminate for color radiative cooling.

According to another embodiment of the present disclosure, a vehicle contains the radiative cooling material.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Herein, when a component "includes" another component, this means that the former component may further include other components without excluding other components unless otherwise stated.

Herein, when a member is described to be located on a "surface," a "top," "one surface," "the other surface," or "both surfaces" of another member, this includes not only a case in which the former member is in contact with the latter member, but also a case in which a third member exists between the two members.

In addition, a "weight average molecular weight" used herein is measured by a conventional method known in the art, and may be measured, for example, by a gel permeation chromatograph (GPC) method.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Laminate for Color Radiative Cooling

A laminate for color radiative cooling according to embodiments of the present disclosure includes a transparent colored layer, an ultraviolet ray and visible ray reflective layer formed on the transparent colored layer, a first far-infrared ray emissive layer formed on the ultraviolet ray and visible ray reflective layer, a near-infrared ray reflective layer formed on the first far-infrared ray emissive layer, and a second far-infrared ray emissive layer formed on the near-infrared ray reflective layer.

Figure 1:
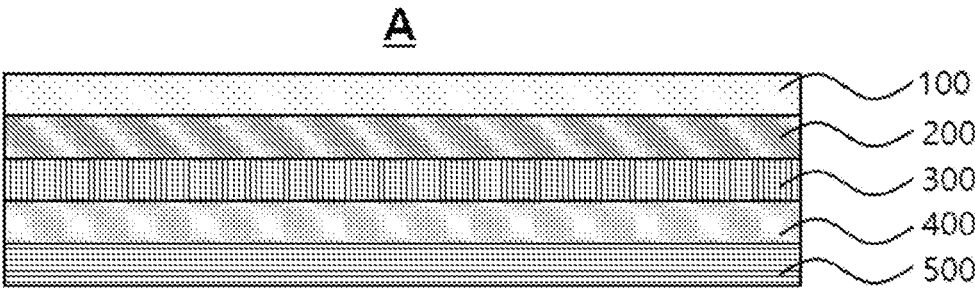
FIG. 1 is a cross-sectional view of a laminate for color radiative cooling according to an embodiment of the present disclosure.

Referring to FIG. 1, a laminate 'A' for color radiative cooling according to embodiments of the present disclosure may have a form in which a transparent colored layer 100, an ultraviolet ray and visible ray reflective layer 200, a first far-infrared ray emissive layer 300, a near-infrared ray reflective layer 400, and a second far-infrared ray emissive layer 500 are stacked in order.

Figure 2:
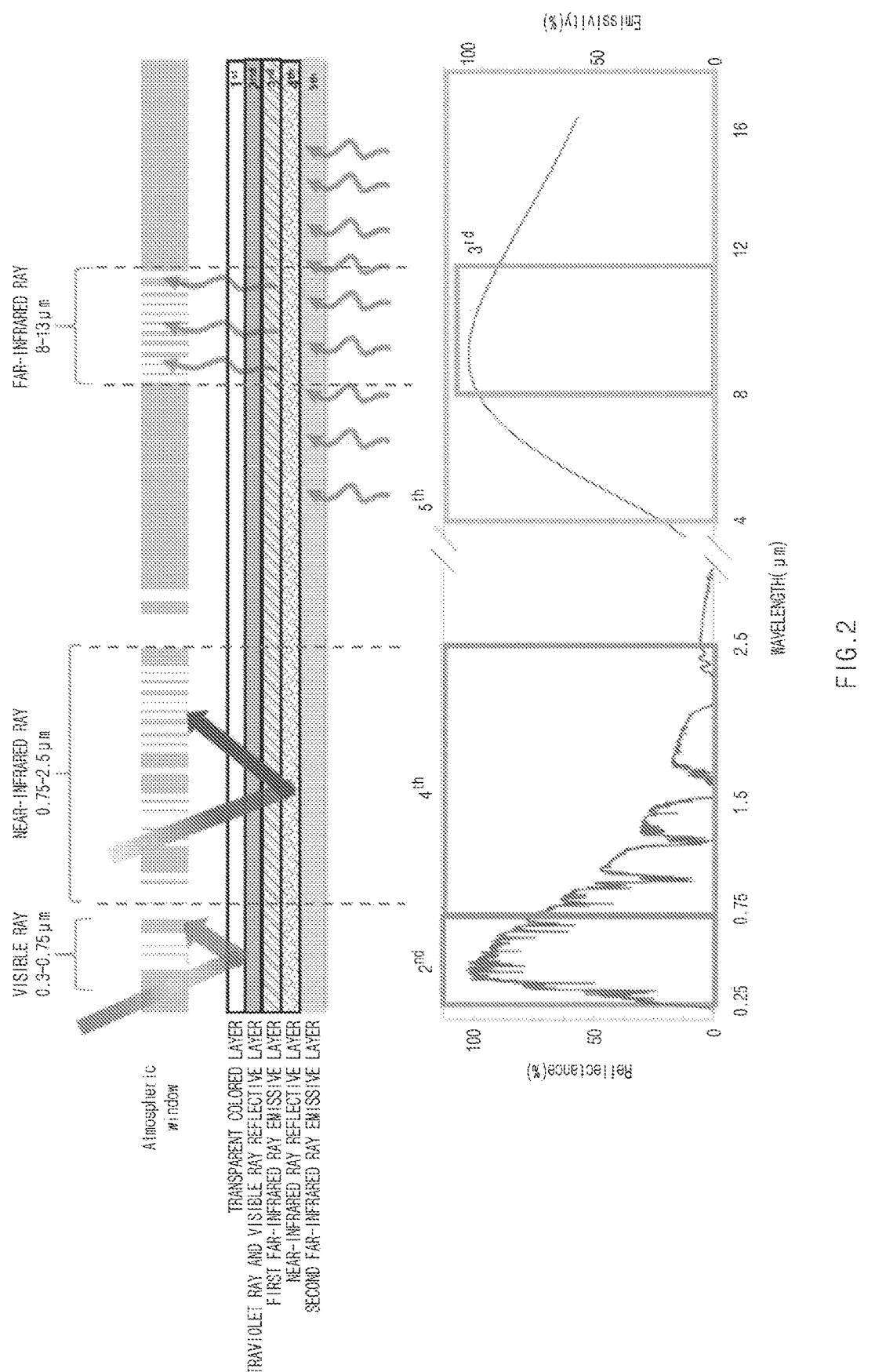
FIG. 2 is a reflectance or emissivity graph of each layer of a laminate for color radiative cooling according to an embodiment of the present disclosure.

Specifically, referring to FIG. 2, the ultraviolet ray and visible ray reflective layer $2^{nd}$ may reflect a visible ray, and the first far-infrared ray emissive layer $3^{rd}$ may selectively emit a portion of a far-infrared spectrum. In addition, the near-infrared ray reflective layer $4^{th}$ may reflect a near-infrared ray having a wavelength in a range from 750 to 2,500 nm, and the second far-infrared ray emissive layer $5^{th}$ may emit the far-infrared ray in a wide band.

As described above, the laminate for the radiative cooling according to embodiments of the present disclosure may include the second far-infrared ray emissive layer for emitting the far-infrared ray in the wide band as an outermost layer, specifically as a bottommost layer, so that heat generated at a lower end of the laminate, that is, inside a vehicle, may be absorbed and emitted to the outside of the laminate. In addition, as described above, the laminate includes the first far-infrared ray emissive layer that selectively emits the portion of the far-infrared spectrum at an upper end, specifically, beneath the reflective layer, so that the heat transferred from the second far-infrared ray emissive layer may be effectively released to the outside of the laminate. As described above, the laminate for the radiative cooling according to embodiments of the present disclosure absorbs and emits heat even at the lower end of the laminate, thereby having a remarkably excellent radiative cooling performance. In addition, a radiative cooling material that transfers the heat absorbed from the lower end to the upper end and releases the heat is generally referred to as a bi-directional radiative cooling material.

In addition, the transparent colored layer contains a first thermoplastic resin, the first far-infrared ray emissive layer contains a second thermoplastic resin, and the second far-infrared ray emissive layer contains a third thermoplastic resin. In this regard, the first thermoplastic resin, the second thermoplastic resin, and the third thermoplastic resin may have optical properties, specifically, refractive indices and/or extinction coefficients different from each other. Accordingly, the layers containing the respective resins may have the different optical properties, and thus, have different emitting and/or reflecting wavelengths. As described above, the laminate for the radiative cooling according to embodiments of the present disclosure including the three types of thermoplastic resins having the different optical properties in the respective layers has the very excellent radiative cooling performance.

Transparent Colored Layer

The transparent colored layer serves to impart a color to the laminate.

The transparent colored layer contains the first thermoplastic resin. Specifically, the transparent colored layer may contain the first thermoplastic resin and have the color.

The first thermoplastic resin may contain, for example, at least one selected from a group consisting of poly(methyl methacrylate) (PMMA), polymethylpentene (PMP), and polyethylene (PE). Specifically, the first thermoplastic resin may contain the poly(methyl methacrylate) (PMMA).

In addition, the first thermoplastic resin may have a weight average molecular weight (Mw) in a range from 20,000 to 100,000 g/mol, from 20,000 to 50,000 g/mol, or from 50,000 to 100,000 g/mol. When the weight average molecular weight of the first thermoplastic resin is out of the above range, a problem in which an infrared refractive index of the prepared laminate decreases or an infrared emissivity thereof decreases may occur.

The first thermoplastic resin may have a transmittance in a range from 80% to 95% for a wavelength in a range from 250 to 2,500 nm. In addition, the first thermoplastic resin may have a reflectance in a range from 3% to 15% or from 5% to 10% with respect to the wavelength in the range from 250 to 2,500 nm. When the transmittance and/or the reflectance of the first thermoplastic resin is out of the above range, a problem of increasing a surface temperature of the laminate including the first thermoplastic resin may occur.

The transparent colored layer may be colored in a chromatic color.

In addition, the transparent colored layer may have an average thickness in a range from 10 to 200 μm, from 30 to 150 μm, or from 50 to 100 μm. When the average thickness of the transparent colored layer is smaller than the above range, the problem in which the infrared emissivity of the prepared laminate decreases may occur, and when the average thickness exceeds the above range, a surface temperature cooling performance of the laminate is deteriorated by the occurrence of the emission of the far-infrared ray in the wide band.

The transparent colored layer may have a transmittance equal to or greater than 95% or in a range from 50 to 90% for light having a wavelength in a range from 400 to 780 nm. When the transmittance of the transparent colored layer to the light having the wavelength in the range from 400 to 780 nm is smaller than the above range, a problem in which a durability decreases by transmission of an ultraviolet ray may occur, and when the transmittance exceeds the above range, a problem in which the cooling performance is deteriorated by transmission of an infrared ray may occur.

Ultraviolet Ray and Visible Ray Reflective Layer

The ultraviolet ray and visible ray reflective layer serves to block the heat by reflecting the ultraviolet ray and the visible ray having a wavelength in a range from 10 to 780 nm.

The ultraviolet ray and visible ray reflective layer is formed on the transparent colored layer and contains a polyolefin-based polymer.

For example, the polyolefin-based polymer may contain at least one selected from a group consisting of polyethylene (PE), polypropylene (PP), polybutylene (PB), and copolymers thereof. Specifically, the polyolefin-based polymer may contain the polyethylene (PE). More specifically, the polyolefin-based polymer may contain high-density polyethylene (HDPE).

The polyolefin-based polymer may have a weight average molecular weight (Mw) in a range from 50,000 to 300,000 g/mol or from 100,000 to 250,000 g/mol. When the weight average molecular weight of the polyolefin-based polymer is smaller than or exceeds the above range, ultraviolet and visible reflectance of the laminate may be reduced, and thus, the radiative cooling performance and the durability may be deteriorated.

The ultraviolet ray and visible ray reflective layer may not be particularly limited as long as it contains the polyolefin-based polymer and is in a form that is generally usable in the preparation of the laminate. For example, the ultraviolet ray and visible ray reflective layer may be in a form of a textile, a film, a sheet, or the like. Specifically, the ultraviolet ray and visible ray reflective layer may be made of the textile containing the polyolefin-based polymer. When the textile containing the polyolefin-based polymer is used as the ultraviolet ray and visible ray reflective layer, there is an effect of increasing the ultraviolet and visible reflectance of the laminate.

In addition, the ultraviolet ray and visible ray reflective layer may have an average thickness in a range from 100 to 300 μm, from 130 to 300 μm, or from 130 to 200 μm. When the average thickness of the ultraviolet ray and visible ray reflective layer is smaller than the above range, the ultraviolet and visible reflectance of the laminate may decrease, and thus, the radiative cooling performance may be deteriorated, and when the average thickness exceeds the above range, a flexibility of the laminate may be deteriorated.

First Far-Infrared Ray Emissive Layer

The first far-infrared ray emissive layer may selectively emit the portion of the far-infrared spectrum having a wavelength in a range from 4 to 20 μm (see FIG. 2). Accordingly, the first far-infrared ray emissive layer serves to improve the radiative cooling performance of the laminate by releasing the heat in the laminate including the first far-infrared ray emissive layer. In this regard, a wavelength selectively emitted by the first far-infrared ray emissive layer may be in a range from 8 to 13 μm (see FIG. 2).

The far-infrared ray emissive layer is formed on the ultraviolet ray and visible ray reflective layer and contains the second thermoplastic resin.

The second thermoplastic resin may contain, for example, at least one selected from a group consisting of ethylene tetrafluoroethylene (ETFE), polytetrafluoroethylene (PTFE), polychlorotrifluoroethylene (PCTFE), fluoroethylene-propylene copolymer (FEP), polyvinylidene-fluoride (PVDF), polyethylene terephthalate (PET), polymethylpentene (PMP), poly(methyl methacrylate) (PMMA), polydimethylsiloxane (PDMS), and copolymers thereof. Specifically, the second thermoplastic resin may contain at least one selected from a group consisting of ethylene tetrafluoroethylene (ETFE), poly(methyl methacrylate) (PMMA), and polymethylpentene (PMP).

In addition, a weight average molecular weight of the second thermoplastic resin may be in a range from 100,000 to 5,000,000 g/mol, from 200,000 to 3,000,000 g/mol, or from 500,000 to 2,000,000 g/mol. When the weight average molecular weight of the second thermoplastic resin is out of the above range, the far-infrared ray selective emissivity may decrease, and thus, the radiative cooling performance of the laminate may be deteriorated.

The second thermoplastic resin may have an emissivity in a range from 75% to 95% or from 80% to 90% at the wavelength in the range from 8 to 13 μm. That is, the second thermoplastic resin has excellent emissivity for the wavelength in the range from 8 to 13 μm, thereby selectively emitting the portion of the far-infrared spectrum. When the emissivity of the second thermoplastic resin is out of the above range, the problem of increasing the surface temperature of the laminate may occur.

The first far-infrared ray emissive layer may have an average thickness in a range from 10 to 150 μm, from 10 to 100 μm, or from 20 to 50 μm. When the average thickness of the first far-infrared ray emissive layer is smaller than or greater than the above range, the far-infrared ray selective emissivity may be reduced, and thus, the radiative cooling performance of the laminate may be deteriorated.

Near-Infrared Ray Reflective Layer

The near-infrared ray reflective layer serves to block the heat by reflecting the near-infrared ray having the wavelength in the range from 750 to 2,500 nm.

The near-infrared ray reflective layer is formed on the first far-infrared ray emissive layer and contains the metal.

For example, the near-infrared ray reflective layer may contain at least one metal selected from a group consisting of aluminum (Al), silver (Ag), gold (Au), chromium (Cr), copper (Cu), platinum (Pt), iron (Fe), tin (Sn), and nickel (Ni). Specifically, the near-infrared ray reflective layer may contain Al, Ag, Au, or Cr. When the near-infrared ray reflective layer contains at least one of the metals described above, there is an effect of increasing near-infrared reflectance of the laminate resulted from light interference.

In addition, the near-infrared ray reflective layer may have an average thickness in a range from 1 to 150 μm, from 20 to 150 μm, or from 30 to 100 μm. When the average thickness of the near-infrared ray reflective layer is smaller than the above range, the near-infrared ray reflection effect may decrease, and thus, the cooling performance of the laminate may be insufficient, and when the average thickness exceeds the above range, a reflection effect for an undesired wavelength may increase, and thus, the laminate may exhibit a color other than a target color or the radiative cooling performance of the laminate may be insufficient.

Second Far-Infrared Ray Emissive Layer

The second far-infrared ray emissive layer may emit the far-infrared ray having the wavelength in the range from 4 to 20 μm in the wide band. Accordingly, the second far-infrared ray emissive layer serves to improve the radiative cooling performance of the laminate by releasing the heat of the laminate including the second far-infrared ray emissive layer.

The second far-infrared ray emissive layer is formed on the near-infrared ray reflective layer and contains the third thermoplastic resin.

The third thermoplastic resin may contain at least one selected from a group consisting of polycarbonate (PC), an acrylic resin, polyurethane (PU), acrylonitrile butadiene styrene (ABS), poly(methyl methacrylate) (PMMA), polyethylene terephthalate (PET), poly(vinyl alcohol) (PVA), polydimethylsiloxane (PDMS), polychlorotrifluoroethylene (PCTFE), polylactic acid (PLA), polymethylpentene (PMP), cellulose, polyvinyl chloride (PVC), and copolymers thereof. Specifically, the third thermoplastic resin may contain at least one selected from a group consisting of the polycarbonate (PC), the acrylic resin, the polyurethane, the polyethylene terephthalate, and the polydimethylsiloxane. Specifically, the third thermoplastic resin may contain the polycarbonate.

In addition, the third thermoplastic resin may have a weight average molecular weight in a range from 20,000 to 500,000 g/mol, from 50,000 to 400,000 g/mol, or from 100,000 to 300,000 g/mol. When the weight average molecular weight of the third thermoplastic resin is smaller than or exceeds the above range, a problem in which near-infrared emissivity of the laminate decreases may occur.

The third thermoplastic resin may have an emissivity in a range from 75% to 95%, from 75% to 85%, or from 90% to 95% with respect to a wavelength in a range from 5 to 18 $\mu$m. That is, the third thermoplastic resin may emit the far-infrared ray having the wavelength in the range from 5 to 18 $\mu$m in the wide band. When the emissivity of the third thermoplastic resin is out of the above range, the problem of increasing the surface temperature may occur.

The second far-infrared ray emissive layer may further contain at least one selected from a group consisting of silica (SiO$_2$), titanium dioxide (TiO$_2$), and zinc oxide (ZnO).

In addition, the second far-infrared ray emissive layer may have an average thickness in a range from 50 to 250 $\mu$m or from 100 to 300 $\mu$m. When the average thickness of the second far-infrared ray emissive layer is smaller than the above range, the far-infrared emissivity of the laminate may decrease, and thus, the radiative cooling performance may be insufficient, and when the average thickness exceeds the above range, thermal conductivity may decrease, and thus, the surface cooling performance of the laminate may be deteriorated.

The laminate for the color radiative cooling according to embodiments of the present disclosure as described above has excellent reflectivity for the visible ray and the near-infrared ray having the wavelength in the range from 750 to 2,500 nm and has excellent emissivity for the infrared ray having a wavelength equal to or greater than 2.5 $\mu$m, thereby having the very excellent radiative cooling performance. In addition, the laminate for the color radiative cooling has excellent selective emissivity for a wavelength in a range from 8 to 14 $\mu$m, which is an atmospheric window, and thus, has the excellent radiative cooling performance. Furthermore, the laminate for the color radiative cooling has the very excellent radiative cooling performance because of low absorption of heat energy by convection, and thus may be suitably used as a material in various fields requiring a material with the excellent radiative cooling performance, such as the vehicle.

Material for Radiative Cooling

A material for radiative cooling of embodiments of the present disclosure includes the laminate for the color radiative cooling.

For example, the material for the radiative cooling may be applied to a roof panel or glass for a vehicle or a building. When the material for the radiative cooling is applied to the roof panel or the glass for the vehicle or the building, the second far-infrared ray emissive layer of the material for the radiative cooling may be deposited on the roof panel or the glass. Accordingly, the radiative cooling effect may be further improved as the laminate absorbs heat inside the vehicle or the building, which is located beneath the second far-infrared ray emissive layer, and releases the heat to the outside.

As described above, the material for the radiative cooling has the excellent visible and the near-infrared reflectivity and has the excellent infrared emissivity thereby having the very excellent radiative cooling performance. In addition, the material for the radiative cooling has the excellent emissivity for the wavelength in the range from 8 to 14 $\mu$m, which is the atmospheric window, and thus has the excellent radiative cooling performance. Furthermore, the material for the radiative cooling has the very excellent radiative cooling performance because of the low absorption of the heat energy by the convection and thus may be suitably used as the material in the various fields requiring the material with the excellent radiative cooling performance, such as the vehicle.

Vehicle or Building

A vehicle or a building of embodiments of the present disclosure contains the material for the radiative cooling. As a result, the vehicle and the building are able to save cooling energy in summer and thus have excellent energy efficiency.

Hereinafter, embodiments of the present disclosure will be described in more detail via Examples. However, such Examples are only for helping understanding of embodiments of the present disclosure, and the scope of the present disclosure is not limited to such Examples in any sense.

EXAMPLES

Preparation Example 1. Preparation of Laminate

High-density polyethylene (HDPE) textile (manufacturer: Dupont, product name: Tyvek®, average thickness: 160 $\mu$m) was used as the ultraviolet ray and visible ray reflective layer. Thereafter, a film (average thickness of 30 $\mu$m) made of ethylene tetrafluoroethylene (ETFE) (manufacturer: Chemours, product name: ETFE, weight average molecular weight (Mw): 1,00,000 g/mol, emissivity for wavelength from 8 to 13 $\mu$m: 85%) was deposited onto the HDPE textile to form the first far-infrared ray emissive layer.

Thereafter, the near-infrared ray reflective layer was formed by depositing a thin film (average thickness: 50 $\mu$m) made of aluminum (Al) onto the first far-infrared ray emissive layer.

Thereafter, a film (average thickness: 200 $\mu$m) of polycarbonate (PC) (weight average molecular weight (Mw): 200,000 g/mol, emissivity for wavelength from 5 to 18 $\mu$m: 80%) was deposited onto the near-infrared ray reflective layer to form the second far-infrared ray emissive layer to prepare the laminate.

Preparation Examples 2 to 13

Laminates were prepared in the same manner as that in Preparation Example 1, except that a thickness and a composition of each layer were adjusted as shown in Table 1.

TABLE 1

| | Ultraviolet ray and visible ray reflective layer thickness (μm) | First far-infrared ray emissive layer thickness (μm) | Near-infrared ray reflective layer thickness (μm) | Second far-infrared ray emissive layer thickness (μm) |
|---|---|---|---|---|
| Preparation Example 1 | 160 | 30 | 50 | 200 |
| Preparation Example 2 | 130 | 30 | 50 | 200 |
| Preparation Example 3 | 300 | 30 | 50 | 200 |
| Preparation Example 4 | 160 | 15 | 50 | 200 |
| Preparation Example 5 | 160 | 200 | 50 | 200 |
| Preparation Example 6 | 160 | 30 | 10 | 200 |
| Preparation Example 7 | 160 | 30 | 200 | 200 |
| Preparation Example 8 | 160 | 30 | 50 | 50 |
| Preparation Example 9 | 160 | 30 | 50 | 500 |
| Preparation Example 10 | — | 30 | 50 | 200 |
| Preparation Example 11 | 160 | — | 50 | 200 |
| Preparation Example 12 | 160 | 30 | — | 200 |
| Preparation Example 13 | 160 | 30 | 50 | — |

Test Example 1: Evaluation of Characteristics

Physical properties of the laminates of Preparation Examples were evaluated in the following manner, and the results are shown in Table 2 and FIG. 3.

Specifically, after mounting an integrating sphere on an ultraviolet-visible spectrophotometer (UV-VIS spectrophotometer) and a Fourier transform infrared spectrometer (FT-IR), reflectance, emissivity, and transmittance for a wavelength in a range from 0.2 to 20 μm of the laminates of Preparation Examples were measured and then average emissivity and average reflectance thereof were calculated. In this regard, the reflectance measurement results of the laminates of Preparation Examples 1 and 10 are shown in FIG. 3.

TABLE 2

| | Average reflectance (%) for wavelength in range from 0.4 to 0.8 μm | Average emissivity (%) for wavelength in range from 8 to 14 μm | Average emissivity (%) for wavelength in range from 4 to 20 μm |
|---|---|---|---|
| Preparation Example 1 | 95 | 90 | 90 |
| Preparation Example 2 | 75 | 90 | 90 |
| Preparation Example 3 | 97 | 50 | 90 |
| Preparation Example 4 | 95 | 70 | 90 |
| Preparation Example 5 | 95 | 60 | 90 |
| Preparation Example 6 | 80 | 90 | 90 |
| Preparation Example 7 | 95 | 90 | 90 |
| Preparation Example 8 | 95 | 90 | 50 |
| Preparation Example 9 | 95 | 90 | 90 |

TABLE 2-continued

| | Average reflectance (%) for wavelength in range from 0.4 to 0.8 μm | Average emissivity (%) for wavelength in range from 8 to 14 μm | Average emissivity (%) for wavelength in range from 4 to 20 μm |
|---|---|---|---|
| Preparation Example 10 | 50 | 90 | 90 |
| Preparation Example 11 | 95 | 10 | 90 |
| Preparation Example 12 | 60 | 90 | 90 |
| Preparation Example 13 | 95 | 90 | 10 |

Figure 3:
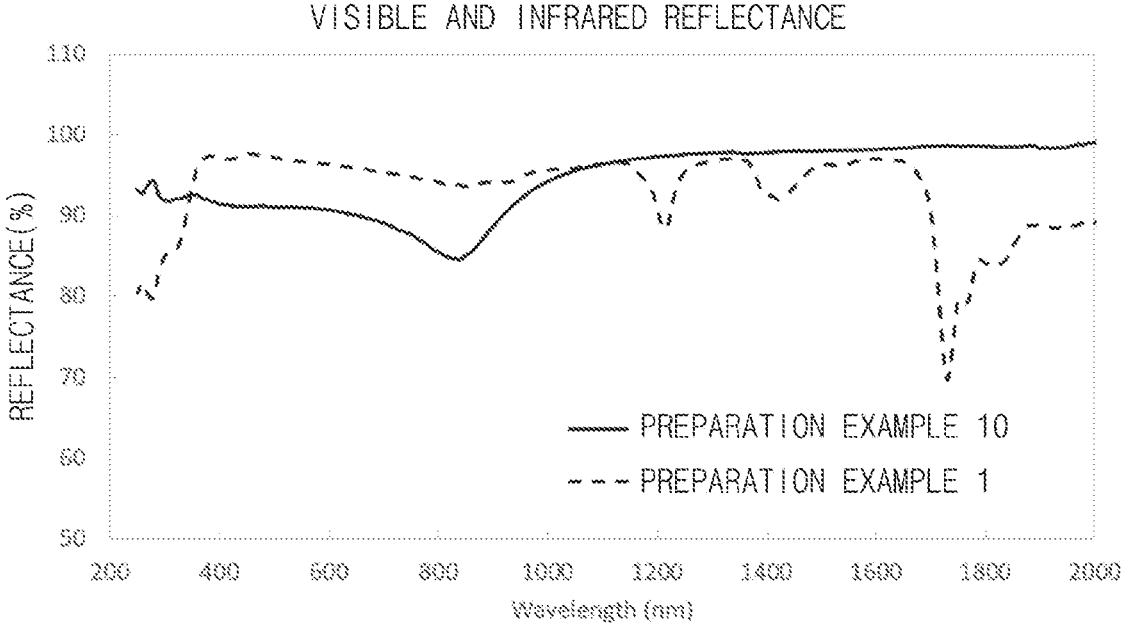
FIG. 3 is a result of measuring reflectance of laminates according to examples of embodiments of the present disclosure.

As shown in Table 2 and FIG. 3, the laminate of Preparation Example 1 has the remarkably high selective emissivity for the wavelength in the range from 8 to 14 μm, which is the atmospheric window, and the remarkably high wide band emissivity for the wavelength in the range from 4 to 20 μm of 90% and has the high reflectance for the visible ray having the wavelength in the range from 0.4 to 0.8 μm of 95%, and thus, is determined to have the excellent radiative cooling performance. In particular, as shown in FIG. 3, compared to the laminate of Preparation Example 10 that does not include the ultraviolet ray and visible ray reflective layer, the laminate of Preparation Example 1 has the significantly higher reflectance for the wavelength in the range from 0.4 to 0.8 μm, and thus, is determined to have better radiative cooling performance.

On the other hand, Preparation Example 2 in which the ultraviolet ray and visible ray reflective layer is thin, Preparation Example 3 in which the ultraviolet ray and visible ray reflective layer is thick, Preparation Example 4 in which the first far-infrared ray emissive layer is thin, Preparation Example 5 in which the first far-infrared ray emissive layer is thick, Preparation Example 6 in which the near-infrared ray reflective layer is thin, Preparation Example 8 in which the second far-infrared ray emissive layer is thin, Preparation Example 10 without the ultraviolet ray and visible ray reflective layer, Preparation Example 11 without the first far-infrared ray emissive layer, Preparation Example 12 without the near-infrared ray reflective layer, and Preparation Example 13 without the second far-infrared ray emissive layer have insufficient reflectance for the visible ray having the wavelength in the range from 0.4 to 0.8 μm smaller than 90%, insufficient selective emissivity for the wavelength in the range from 8 to 14 μm smaller than 80%, or insufficient wide band emissivity for the wavelength in the range from 4 to 20 μm smaller than 60%.

In addition, Preparation Example 7 in which the near-infrared ray reflective layer is thick and Preparation Example 9 in which the second far-infrared ray emissive layer is thick have a problem in that the cooling effect is insufficient as the thermal conductivity of the material decreases.

Example 1. Preparation of Color Laminate

A transparent colored layer (manufacturer: LX MMA, product name: 4006 (RED), average thickness: 50 μm) made of the PMMA (transmittance: 85%, reflectance: 6% for the wavelength in the range from 250 to 2,500 nm) and having a red color was deposited onto the ultraviolet ray and visible ray reflective layer of the laminate of Preparation Example 1 to prepare a laminate for color radiative cooling.

Comparative Example 1

A laminate was prepared in the same manner as in Example 1 except that the transparent colored layer (the PMMA layer), the ultraviolet ray and visible ray reflective layer (the LDPE textile), the second far-infrared ray emissive layer (the PC layer), the near-infrared ray reflective layer (the aluminum layer), and the first far-infrared ray emissive layer (the ETFE layer) were stacked in order.

Comparative Example 2

A laminate was prepared in the same manner as in Example 1 except that the transparent colored layer (the PMMA layer), the near-infrared ray reflective layer (the aluminum layer), the first far-infrared ray emissive layer (the ETFE layer), the ultraviolet ray and visible ray reflective layer (the LDPE textile), and the second far-infrared ray emissive layer (the silica layer) were stacked in order.

Test Example 2: Evaluation of Characteristics

Figure 4:
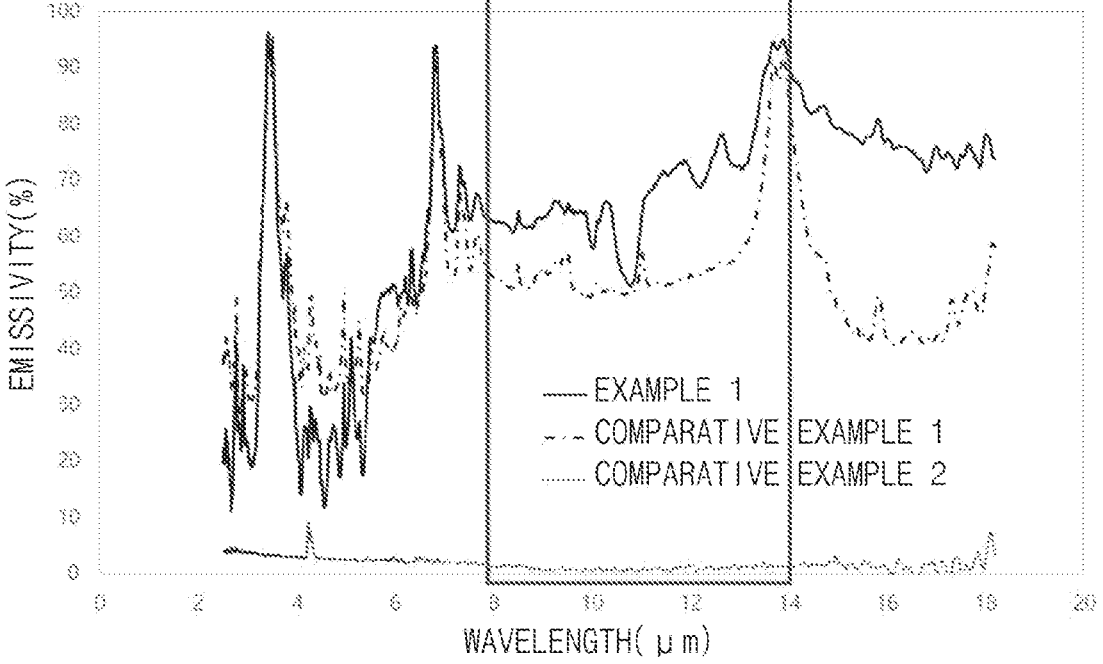
FIG. 4 is a result of measuring emissivity of laminates for color radiative cooling according to examples of embodiments of the present disclosure.

Physical properties (emissivity) of the laminates of Example 1 and Comparative Examples 1 and 2 were evaluated in the same manner as in Test Example 1, and the results are shown in FIG. 4.

As shown in FIG. 4, the laminate of Example 1 has the high emissivity for the wavelength in the range from 8 to 14 μm, which is the atmospheric window, and thus, is determined to have the excellent radiative cooling performance.

On the other hand, the laminates of Comparative Examples 1 and 2 with the different stacking order of the layers have relatively low emissivity for the wavelength in the range from 8 to 14 μm compared to the laminate of Example 1, and thus, are determined to have relatively insufficient radiative cooling performance. In particular, the laminate of Comparative Example 2 has a remarkably low emissivity, and thus, is determined to have almost no radiative cooling performance.

The laminate for the color radiative cooling according to embodiments of the present disclosure has the excellent visible and infrared reflectivity and the excellent infrared emissivity, and thus, has the very excellent radiative cooling performance. In addition, the laminate for the color radiative cooling has the excellent emissivity for the wavelength in the range from 8 to 14 μm, which is the atmospheric window, and thus has the excellent radiative cooling performance. Furthermore, the laminate for the radiative cooling has the very excellent radiative cooling performance because of the low absorption of the heat energy by the convection, so that the laminate may be suitably used as the material in the various fields such as the vehicle, an aircraft (e.g., an advanced air mobility (AAM) and an urban air mobility (UAM)), a robot, a building, and the like that require the material having the excellent radiative cooling performance.

Hereinabove, although embodiments of the present disclosure have been described with reference to exemplary embodiments and the accompanying drawings, the present disclosure is not limited thereto, but may be variously modified and altered by those skilled in the art to which present disclosure pertains without departing from the spirit and scope of the present disclosure claimed in the following claims.

What is claimed is:

1. A laminate for color radiative cooling, the laminate comprising:
a transparent colored layer comprising a first thermoplastic resin;
an ultraviolet ray and visible ray reflective layer on the transparent colored layer and comprising a polyolefin-based polymer;
a first far-infrared ray emissive layer on the ultraviolet ray and visible ray reflective layer and comprising a second thermoplastic resin;
a near-infrared ray reflective layer on the first far-infrared ray emissive layer and comprising a metal; and
a second far-infrared ray emissive layer on the near-infrared ray reflective layer and comprising a third thermoplastic resin,
wherein:
the first far-infrared ray emissive layer is configured to selectively emit a portion of a far-infrared spectrum having a first wavelength in a range from 4 to 20 μm,
the second far-infrared ray emissive layer is configured to emit a far-infrared ray having a second wavelength in the range from 4 to 20 μm in a wide band, and
the near-infrared ray reflective layer blocks heat by reflecting a near-infrared ray having a third wavelength in a second range from 750 to 2,500 nm.

2. The laminate of claim 1, wherein the first thermoplastic resin comprises at least one material selected from a group consisting of poly(methyl methacrylate) (PMMA), polymethylpentene (PMP), and polyethylene (PE).

3. The laminate of claim 1, wherein the transparent colored layer is colored in a chromatic color.

4. The laminate of claim 1, wherein the transparent colored layer has a transmittance equal to or greater than 90% for light having a fourth wavelength in a third range from 400 to 780 nm.

5. The laminate of claim 1, wherein the polyolefin-based polymer comprises at least one material selected from a group consisting of polyethylene (PE), polypropylene (PP), polybutylene (PB), and copolymers thereof.

6. The laminate of claim 1, wherein the ultraviolet ray and visible ray reflective layer comprises a textile comprising the polyolefin-based polymer.

7. The laminate of claim 1, wherein the second thermoplastic resin comprises at least one material selected from a group consisting of an ethylene-tetrafluoroethylene copolymer (ETFE), polytetrafluoroethylene (PTFE), polychlorotrifluoroethylene (PCTFE), a fluoroethylene-propylene copolymer (FEP), polyvinylidene-fluoride (PVDF), polyethylene terephthalate (PET), polymethylpentene (PMP), poly(methyl methacrylate) (PMMA), polydimethylsiloxane (PDMS), and copolymers thereof.

8. The laminate of claim 1, wherein:
the first far-infrared ray emissive layer has a first average thickness in a first thickness range from 10 to 150 μm; and
the second far-infrared ray emissive layer has a second average thickness in a second thickness range from 50 to 250 μm.

9. The laminate of claim 1, wherein the near-infrared ray reflective layer comprises at least one metal selected from a group consisting of aluminum (Al), silver (Ag), gold (Au), chromium (Cr), copper (Cu), platinum (Pt), iron (Fe), tin (Sn), and nickel (Ni).

10. The laminate of claim 1, wherein the third thermoplastic resin comprises at least one material selected from a group consisting of polycarbonate (PC), an acrylic resin, polyurethane (PU), acrylonitrile butadiene styrene (ABS), poly(methyl methacrylate) (PMMA), polyethylene terephthalate (PET), poly(vinyl alcohol) (PVA), polydimethylsiloxane (PDMS), polychlorotrifluoroethylene (PCTFE), polylactic acid (PLA), polymethylpentene (PMP), cellulose, polyvinyl chloride (PVC), and copolymers thereof.

11. The laminate of claim 1, wherein:
the transparent colored layer has a first average thickness in a first thickness range from 10 to 200 μm;
the ultraviolet ray and visible ray reflective layer has a second average thickness in a second thickness range from 100 to 300 μm; and
the near-infrared ray reflective layer has a third average thickness in a third thickness range from 1 to 150 μm.

12. A radiative cooling material comprising:
a laminate comprising:
a transparent colored layer comprising a first thermoplastic resin;
an ultraviolet ray and visible ray reflective layer on the transparent colored layer and comprising a polyolefin-based polymer;
a first far-infrared ray emissive layer on the ultraviolet ray and visible ray reflective layer and comprising a second thermoplastic resin;
a near-infrared ray reflective layer on the first far-infrared ray emissive layer and comprising a metal; and
a second far-infrared ray emissive layer on the near-infrared ray reflective layer and comprising a third thermoplastic resin,
wherein:
the first far-infrared ray emissive layer is configured to selectively emit a portion of a far-infrared spectrum having a first wavelength in a first range from 4 to 20 μm, the second far-infrared ray emissive layer is configured to emit a far-infrared ray having a second wavelength in the first range from 4 to 20 μm in a wide band, and
the near-infrared ray reflective layer blocks heat by reflecting a near-infrared ray having a third wavelength in a second range from 750 to 2,500 nm.

13. The radiative cooling material of claim 12, wherein the radiative cooling material is to be applied to a roof panel or glass for a vehicle or a building.

14. A vehicle comprising:
a vehicle body comprising a roof panel;
a glass; and
a radiative cooling material on the roof panel or the glass, the radiative cooling material comprising:
a transparent colored layer comprising a first thermoplastic resin;
an ultraviolet ray and visible ray reflective layer on the transparent colored layer and comprising a polyolefin-based polymer;
a first far-infrared ray emissive layer on the ultraviolet ray and visible ray reflective layer and comprising a second thermoplastic resin;
a near-infrared ray reflective layer on the first far-infrared ray emissive layer and comprising a metal; and
a second far-infrared ray emissive layer on the near-infrared ray reflective layer and comprising a third thermoplastic resin,
wherein:
the first far-infrared ray emissive layer is configured to selectively emit a portion of a far-infrared spectrum having a first wavelength in a first range from 4 to 20 μm,
the second far-infrared ray emissive layer is configured to emit a far-infrared ray having a second wavelength in the first range from 4 to 20 μm in a wide band, and
the near-infrared ray reflective layer blocks heat by reflecting a near-infrared ray having a third wavelength in a second range from 750 to 2,500 nm.

15. The vehicle of claim 14, wherein the first thermoplastic resin comprises at least one material selected from a group consisting of poly(methyl methacrylate) (PMMA), polymethylpentene (PMP), and polyethylene (PE).

16. The vehicle of claim 14, wherein the transparent colored layer is colored in a chromatic color and has a transmittance equal to or greater than 90% for light having a fourth wavelength in a third range from 400 to 780 nm.

17. The vehicle of claim 14, wherein the polyolefin-based polymer comprises at least one material selected from a group consisting of polyethylene (PE), polypropylene (PP), polybutylene (PB), and copolymers thereof.

18. The vehicle of claim 14, wherein the second thermoplastic resin comprises at least one material selected from a group consisting of an ethylene-tetrafluoroethylene copolymer (ETFE), polytetrafluoroethylene (PTFE), polychlorotrifluoroethylene (PCTFE), a fluoroethylene-propylene copolymer (FEP), polyvinylidene-fluoride (PVDF), polyethylene terephthalate (PET), polymethylpentene (PMP), poly(methyl methacrylate) (PMMA), polydimethylsiloxane (PDMS), and copolymers thereof.

19. The vehicle of claim 14, wherein:
the first far-infrared ray emissive layer has a first average thickness in a first thickness range from 10 to 150 μm; and the second far-infrared ray emissive layer has a second average thickness in a second thickness range from 50 to 250 μm.

20. The vehicle of claim 14, wherein the third thermoplastic resin comprises at least one material selected from a group consisting of polycarbonate (PC), an acrylic resin, polyurethane (PU), acrylonitrile butadiene styrene (ABS), poly(methyl methacrylate) (PMMA), polyethylene terephthalate (PET), poly(vinyl alcohol) (PVA), polydimethylsiloxane (PDMS), polychlorotrifluoroethylene (PCTFE), polylactic acid (PLA), polymethylpentene (PMP), cellulose, polyvinyl chloride (PVC), and copolymers thereof.

* * * * *